(12) United States Patent
Edgley et al.

(10) Patent No.: US 8,316,707 B2
(45) Date of Patent: Nov. 27, 2012

(54) METHOD FOR MEASURING THE LEVEL OF LIQUID CRYOGEN IN A CRYOGEN VESSEL

(75) Inventors: Paul William Edgley, Bampton (GB); Mark London, Oxford (GB); Benjamin Metcalfe, St Austell (GB); Vladimir Mikheev, Bicester (GB)

(73) Assignee: Siemens Plc, Frimley, Camberley (GB)

( * ) Notice: Subject to any disclaimer, the term of this patent is extended or adjusted under 35 U.S.C. 154(b) by 0 days.

(21) Appl. No.: 13/234,397

(22) Filed: Sep. 16, 2011

(65) Prior Publication Data

US 2012/0067120 A1 Mar. 22, 2012

(30) Foreign Application Priority Data

Sep. 17, 2010 (GB) .................................. 1015613.1

(51) Int. Cl.
*G01F 23/00* (2006.01)
(52) U.S. Cl. ........................................ 73/304 R; 73/295
(58) Field of Classification Search .................. 73/295, 73/304 R
See application file for complete search history.

(56) References Cited

U.S. PATENT DOCUMENTS

| | | | |
|---|---|---|---|
| 3,943,767 A * | 3/1976 | Efferson ........................ | 73/295 |
| 4,118,984 A * | 10/1978 | Kuraoka et al. ................. | 73/295 |
| 6,959,599 B2 * | 11/2005 | Feldstein et al. ............ | 73/304 R |
| 7,062,965 B2 * | 6/2006 | Immel ............................. | 73/295 |
| 7,841,235 B2 * | 11/2010 | Haberstroh ..................... | 73/295 |
| 7,966,878 B2 * | 6/2011 | Hickman et al. ................ | 73/295 |
| 2008/0171663 A1 | 7/2008 | Tamura | |

FOREIGN PATENT DOCUMENTS

EP 0 076 120 A2 4/1983

OTHER PUBLICATIONS

Patent Abstracts of Japan Publication No. 54071664 A.

* cited by examiner

*Primary Examiner* — Hezron E Williams
*Assistant Examiner* — Hoang Nguyen
(74) *Attorney, Agent, or Firm* — Schiff Hardin LLP

(57) ABSTRACT

In a method for measuring the level of liquid cryogen in a cryogen vessel, a current pulse is applied to a cryogen level probe includes an ignition current pulse part of sufficient magnitude to ensure that a resistive front propagates down the probe to below the liquid cryogen surface; a recovery current pulse part allowing that part of the superconducting wire below the surface of the liquid cryogen to return to a superconducting state; and a measurement current pulse part of sufficient magnitude and duration to allow an accurate measurement of the superconducting wire's resistance to be measured.

3 Claims, 2 Drawing Sheets

METHOD FOR MEASURING THE LEVEL OF LIQUID CRYOGEN IN A CRYOGEN VESSEL

BACKGROUND OF THE INVENTION

1. Field of the Invention

The present invention relates to superconducting cryogen level probes used to measure the level of liquid cryogen within a cryogen vessel.

2. Description of the Prior Art

Known cryogen level probes employ a length of superconductive wire, which is partially immersed, substantially vertically, into liquid cryogen contained within a cryogen vessel. Those parts of the superconductive wire in contact with liquid cryogen will be in the superconducting state, while those parts of the wire in gaseous cryogen may be in resistive state, as the gaseous cryogen is a much less effective coolant than the liquid cryogen.

FIG. 1 shows a cryostat such as may be employed for holding magnet coils for an MRI (magnetic resonance imaging) system. A cryogen vessel 1 holds a liquid cryogen 2. The space 3 in the cryogen vessel above the level of the liquid cryogen may be filled with evaporated cryogen. The cryogen vessel is contained in a vacuum jacket 4 which serves to reduce the amount of heat flowing to the cryogen 2 from ambient temperature, by reducing the possibility of conduction or convection heating of the cryogen vessel 1. One or more heat shields 5 may be provided in the vacuum space between the cryogenic vessel 1 and the vacuum jacket 4. These shields serve to reduce the amount of radiated heat reaching the cryogenic vessel 1 from the exterior. An access neck 6 is provided, allowing access to the cryogenic vessel from the exterior. This is used to fill the cryogenic vessel, to provide access for current leads and other connections to superconductive coils housed within the cryogenic vessel, and to allow an escape path for boiled-off gaseous cryogen.

In such systems, it is necessary to regularly monitor the level of the liquid cryogen, while the system is still in an operational state. This is necessary to detect leaks, indicated by an unusually high consumption of cryogen, and to ensure that the liquid cryogen is topped up at appropriate intervals so that the magnet coils or other articles remain sufficiently cooled by the liquid cryogen. At low cryogen levels, parts of the magnet will no longer be immersed in liquid cryogen and will be at a higher temperature than when the cryogen level is high. In the case of a superconducting magnet, this could lead to a magnet quench, which may be dangerous and damaging to the system, and cause the magnetic field to collapse. However, any selected measurement process should not represent an undue heat input to the system. It is generally regarded as sufficient to measure the level of liquid cryogen once per day.

A guide tube 10 is provided inside the cryogenic chamber for housing a cryogen level probe. The guide tube 10 runs from the access neck 6 to approximately the lower extremity of the cryogen vessel. The guide tube is not sealed at its end, but fills with liquid cryogen to the level of the liquid cryogen in the cryogen vessel. The guide tube 10 is provided to house a cryogen level probe for measuring the depth of the liquid cryogen 2 in the cryogenic vessel 1. The cryogen level probe comprises a superconductive wire running the length of the probe.

In operation, a current is passed through the wire. Those parts of the wire which are immersed in liquid cryogen will essentially remain in superconducting state, while those parts of the wire exposed to gaseous cryogen may become resistive. The voltage developed across the resistive part of the wire provides an indication of the resistance of the wire. This in turn indicates the length of the wire which is in the gaseous cryogen, and so provides an indication of the level of the liquid cryogen in the cryogen vessel.

Such cryogen level probes are known to have inconsistent operational performance in terms of reliably measuring the cryogen level in cryogenic vessels. A common application of cryogen level sensors is to measure the level of liquid helium in cryogen vessels containing superconducting magnets for MRI imaging systems. However, the present invention may be applied to the measurement of any cryogen, in any type of cryogen vessel.

Typically, a cryogen level probe includes a length of thin superconducting wire (typically 0.1 mm diameter) located within the guide tube 10, or otherwise within the cryogen vessel—for example, mounted on a non-conductive carrier or enclosed within a protective mesh surround.

In order to effect a measurement of cryogen level, an upper part of the superconducting wire, located in gaseous cryogen, is made resistive by heating with an electrical heater powered from an external electrical control device. Electrical current is passed through the superconducting wire, and heat dissipated in the resistive part of the superconducting wire heats adjacent parts of the wire, rendering those resistive. The electrical heater is wired in series with the superconductor, therefore is provided with the same current as the superconducting wire. In a known arrangement the electrical heater is a wire heater wrapped around the superconducting wire and bonded with varnish. In another known variant the superconducting wire lays over a foil heater, which is electrically in series with the superconducting wire. The result is that a resistive "front" propagates along the superconducting wire until the surface of the liquid cryogen is reached.

Conventionally, those parts of the wire in contact with the liquid cryogen are so efficiently cooled that the resistive front ceases to propagate once it reaches the surface of the liquid cryogen. The resistance of the superconducting wire, and so the voltage across it for a given applied current, at this time provides an indication of the level of the cryogen within the cryogen vessel.

A problem arises in balancing the introduction of sufficient energy to cause the resistive front to reach the liquid layer whilst preventing over-propagation of the resistive front below the surface of the liquid cryogen by the application of too much energy, to prevent a level below the liquid surface being measured. This issue is addressed in UK patent application GB2415512A, which describes measuring cryogen levels using a cryogen level probe, including a possible solution for "stuck" probes where propagation of a resistive front is interrupted by the presence of an unwanted heat loss path.

Cryogen vessels can have inhomogeneous temperature zones above the liquid level, for example particularly cold spots, which can occur unpredictably within a cryogenic vessel due to the complexity of the thermodynamic conditions within the vessel. If insufficient energy is applied to the superconducting wire of the probe, these cold zones will prevent the wire becoming resistive in those areas and therefore an incorrect level measurement will be obtained. Typically the critical temperature for the superconducting wire is 8 to 10 Kelvin for the expected magnetic field strengths in an MRI application and typical operating current. If, for example, liquid helium cryogen is used at a temperature of 4.2K, it is quite likely that regions of gaseous cryogen may be present at temperatures of 8-10K or less.

This invention ensures the reliable and accurate measurement of cryogen levels given the above conditions, overcoming known problems with the method described in GB2415512A.

Other conventional arrangements are described in the following documents. GB2401688A describes a construction of a Helium probe, but makes no reference to the configuration of current pulses applied to the probe in operation.

JP8035875-A1 describes a probe structure, and also mentions a detection circuit using an A-D converter.

JP61031925-A1 describes probe construction rather than control.

SU1272860-A1 describes a probe with a full length heater wound to it, with tapping points.

SUMMARY OF THE INVENTION

The present invention does not address the physical structure of cryogen level probes. Indeed, the present invention may be applied to any known structure of cryogen level probe. Rather, the present invention aims to provide a more reliable measurement of the cryogen level by appropriate control of the profile in magnitude and duration of a current pulse applied to the superconducting wire of the cryogen level probe.

The above object is achieved in accordance with the present invention by a method for measuring the level of liquid cryogen in a cryogen vessel, wherein a current pulse is applied to a cryogen level probe. The current pulse includes an ignition current pulse part of sufficient magnitude to ensure that a resistive front propagates down the probe to below the liquid cryogen surface in the vessel, a recovery current pulse part that allows the part of the superconducting wire below the surface of the liquid cryogen to return to a superconducting state, and a measurement current pulse part of sufficient magnitude and duration to allow an accurate measurement of the resistance of the superconducting wire.

DESCRIPTION OF THE PREFERRED EMBODIMENTS

The present invention aims to provide a more reliable measurement of the cryogen level by appropriate control of the profile in magnitude and duration of a current pulse applied to the superconducting wire of the cryogen level probe. In particular, the present invention provides a current pulse profile for application to the superconducting wire of a cryogen level probe which ensures reliable detection of the liquid to gas boundary.

According to the present invention, reliable detection of the liquid cryogen surface level is achieved by applying excess current through the superconducting wire, above that required to propagate a resistive front within the superconducting wire to the surface of the liquid cryogen, to deliberately over-propagate the resistive front to below the liquid surface. This current is then reduced to allow the superconducting properties of the superconducting wire below the liquid surface to be restored by contact cooling with liquid cryogen. After a defined period, a measuring current is applied and the level of the liquid cryogen in the cryogen vessel can be measured by an otherwise-conventional method. The measuring current is of a magnitude sufficient to provide a precise measurement and to maintain the position of the resistive front at the liquid cryogen surface, but insufficient to cause further propagation of the resistive front within the superconductive wire.

The present invention allows the level of the liquid cryogen to be reliably and accurately detected, independently of the temperature environment of the gaseous cryogen within the cryogen vessel.

Figure 1:
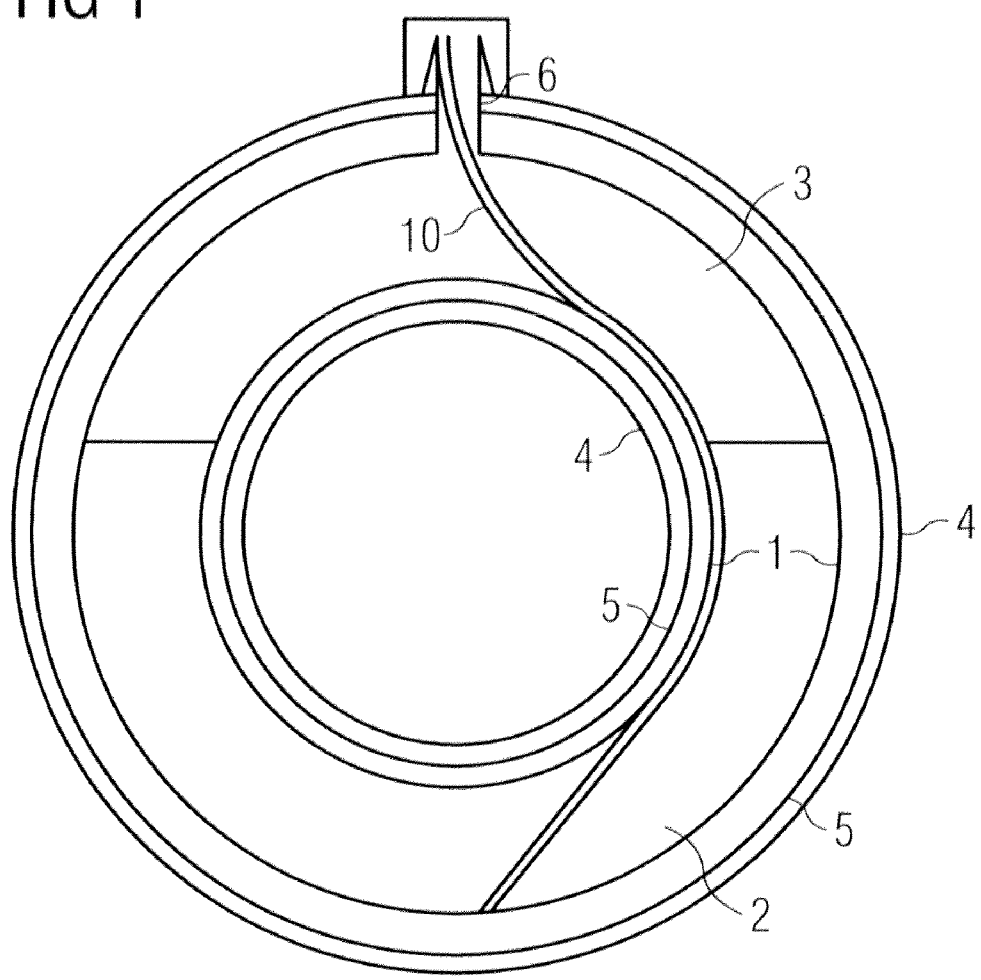
FIG. 1 illustrates a radial cross-section through a cylindrical cryogen vessel, showing a conventional location of a cryogen level probe.
Figure 2:
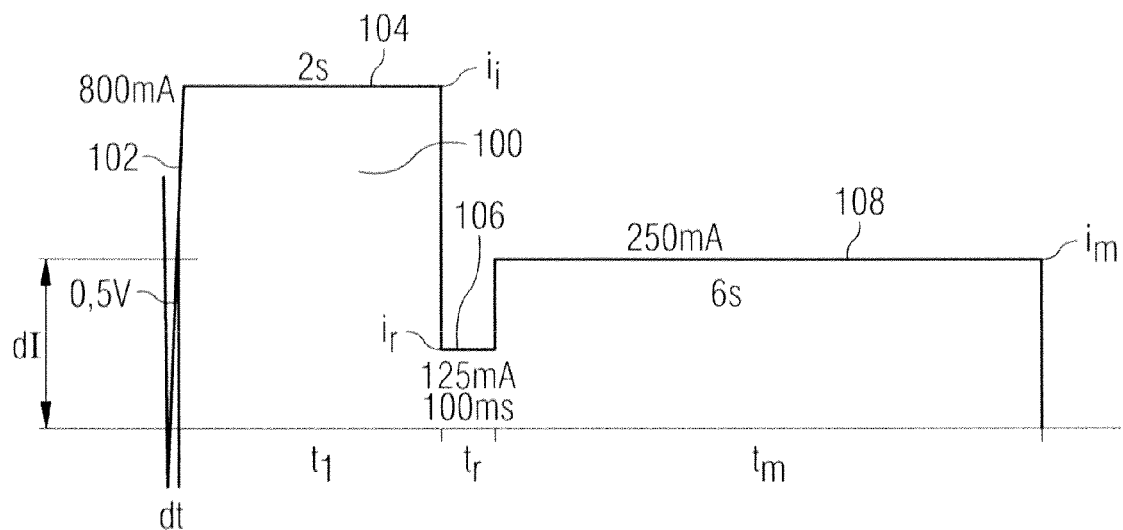
FIG. 2 illustrates an example electrical current pulse which may be applied to a superconducting wire of a cryogen level probe, according to an embodiment of the present invention.

FIG. 2 shows an example current pulse 100 to be applied to the superconducting wire of a cryogen level probe, according to an embodiment of the present invention. It is made up of a leading edge part 102, an ignition pulse part 104, a recovery pulse part 106 and a measurement pulse part 108. The current pulse parts are contiguous and the applied current does not return to zero between the current pulse parts.

The leading edge 102 of the current pulse is preferably ramped linearly, for example at the conventional ramp rate dI/dt of 4 A/s, to a value $i_i$ of for example 800 mA. It is presently believed that the ramp rate dI/dt may be conveniently selected from anywhere within the range 1 A/s-10 A/s, while the current magnitude of the ignition pulse part is preferably no more than 800 mA. The leading edge 102, and the following ignition pulse part 104 together form an ignition pulse. This ignition pulse is intended to ensure propagation of a resistive front the length of the superconductive wire, to a level below the surface of liquid cryogen in the cryogen vessel.

Appropriate selection of the ramp-rate is important because too fast a ramp-rate will cause the cryogen level probe to be subject to a significant force due to interaction of the changing current magnitude with the magnetic field, which may cause damage to the cryogen level probe due to movement. Conversely if the ramp rate is too slow, the time duration of the ignition pulse will increase, and an unacceptable level of additional heat will be introduced, and cause increased boiloff of liquid cryogen.

Conventionally, as described in GB2415512A, a certain voltage across the superconducting wire may be detected to ensure that propagation of the resistive front has begun. A voltage of 0.5V may be selected to provide this indication. The time (dt) and current (dI) demanded for the propagation-indicating voltage of 0.5V across the superconducting wire to be reached may be recorded. If the selected voltage is not reached within a predetermined time, the measurement attempt may be abandoned, and a fault indicated to an operator.

The duration time $t_i$ for the ignition pulse part 104 may be 2-3 seconds. At the end of that time, the ignition pulse ends and the applied currents drops to a recovery current level $i_r$, for example of 125 mA-175 mA for a time $t_r$ of for example 100 ms, in the recovery pulse part 106.

The variable parameters for the recovery pulse part 106—current magnitude and duration time—should be carefully chosen, as they determine the reliability of the detection of the liquid cryogen level. The values chosen for the current magnitude $i_r$, and the time duration $t_r$ of the recovery current pulse part determine the recovery period of the superconducting zone below the surface of the liquid cryogen, as the resistive front 'relaxes' back to the liquid cryogen level. Suitable values for the current magnitude $i_r$, and the time duration $t_r$ of the recovery current pulse part may be found empirically for any particular combination of cryogen, cryogen vessel, and probe.

After the recovery pulse part 106, the applied current magnitude is increased to a measurement level $i_m$ for the measurement current pulse part 108. The measurement current level $i_m$ is typically of 250 mA to 1 A, and the time duration $t_m$ of the measurement pulse part may be for example 6 seconds.

The measurement pulse part 108 provides a constant current of a magnitude $i_m$ sufficient to maintain the position of the resistive front within the superconducting wire at the surface of the liquid cryogen, but not to cause it to propagate below the surface of the liquid cryogen. This part of the applied current pulse and the associated measurement operate conventionally.

In summary, therefore, according to the present invention, a cryogen level probe comprising a superconducting wire running the length of the probe is operated by application of a current pulse 100 through the superconducting wire, the current pulse beginning with a ramped leading edge 102 which increases current through the wire to an ignition magnitude $i_i$. The current remains at that current magnitude for an ignition pulse part duration $t_i$ which causes a resistive front to propagate down the superconductive wire to a level below the surface of liquid cryogen. The current magnitude then decreases to a recovery magnitude $i_r$, for a recovery duration $t_r$. This allows the part of the superconducting wire below the surface of the liquid cryogen to be cooled by the liquid cryogen so that the resistive front returns to the surface of the liquid cryogen. The current magnitude then increases to a measurement magnitude $i_m$, for a measurement duration $t_m$. This measurement magnitude $i_m$ is sufficient to maintain the resistive front at the surface of the liquid cryogen, but insufficient to cause it to propagate below the surface of the liquid cryogen. During the measurement duration $t_m$, the resistance of the superconducting wire is measured, as is conventional in itself, and the measured resistance is used to calculate the level of liquid cryogen in the cryogen vessel.

As mentioned above, the current magnitude $i_r$ and the time duration $t_r$ of the recovery current pulse part 106 needs to be carefully selected, although this may be performed by routine trial-and-error experimentation.

Figure 3:
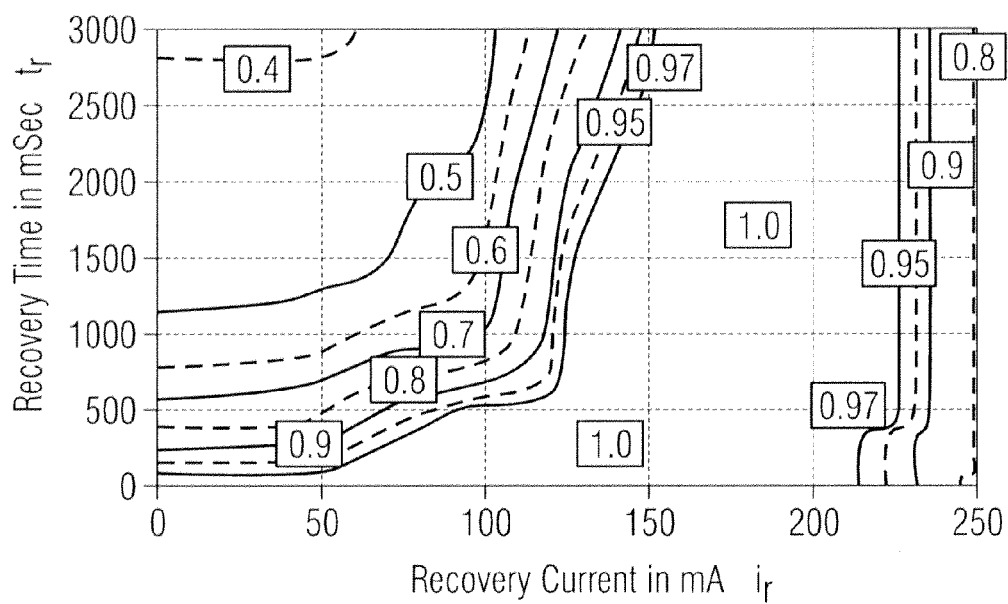
FIG. 3 illustrates ranges of acceptable parameters for recovery current pulse parts applied to a superconducting wire of a cryogen level probe, according to an embodiment of the present invention.

FIG. 3 shows an example plot of performance margin of the superconducting cryogen probe operated according to the method of the present invention, using a range of current magnitudes $i_r$ and the time durations $t_r$ of the recovery current pulse part 106. The performance margin, shown in rectangular boxes in FIG. 3, represents the proportion of successfully working probes set with the indicated particular parameters $i_r$, $t_r$. In the zone labelled 1.0, 97%-100% of probes subject to these parameters will read the correct level. Likewise the zone labelled 0.95 indicates that 90%-97% of probes subject to these parameters will read the correct level. In this example, the ignition pulse part 104 had a current magnitude $i_i$ of 600 mA, and a time duration $t_i$ of 2 s, as in the example shown in FIG. 2. As illustrated, a preferred range of performance margin of 0.97-1.00 may be achieved with a range of current magnitudes $i_r$ and the time durations $t_r$ of the recovery current pulse part 106. Preferably, values for these parameters are selected from the central part of the range of values providing the desired performance margin. In this example, values of current magnitude $i_r$=175 mA and the time duration $t_r$=1500 ms are chosen for the recovery current pulse part 106, as illustrated in FIG. 2. The corresponding point is shown circled in FIG. 3.

Equivalent charts and selections of parameters for the current magnitudes $i_r$ and the time durations $t_r$ of the recovery current pulse part may be derived experimentally for other combinations of cryogen, probe and cryogen vessel, to enable appropriate values of these parameters to be selected.

According to the present invention, the current pulse applied to a cryogen level probe includes an ignition current pulse part of sufficient magnitude to ensure that a resistive front propagates down the probe to below the liquid cryogen surface; a recovery current pulse part allowing that part of the superconducting wire below the surface of the liquid cryogen to return to a superconducting state; and a measurement current pulse part of sufficient magnitude and duration to allow an accurate measurement of the superconducting wire's resistance to be measured. By providing an ignition pulse of sufficient magnitude and duration to ensure that the resistive front propagates to below the surface of the liquid cryogen, the difficulties of the prior art are overcome. The resistive front does not become "stuck" at cold spots or on unwanted heat loss paths.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for measuring a level of a surface of liquid cryogen in a cryogen vessel, comprising the steps of:
   introducing a cryogen level probe comprising a superconducting wire running the length of the probe, substantially vertically, into a cryogen vessel containing liquid cryogen;
   passing electric current through the superconducting wire to propagate a resistive front down the superconducting wire to the surface of the liquid cryogen by applying a current pulse having a profile comprising a leading edge part, an ignition pulse part, a recovery pulse part and a measurement pulse part;
   the leading edge part increasing a magnitude of current to a first magnitude for a first duration, to form the ignition pulse part;
   the ignition pulse part having the magnitude and duration that produce a resistive front propagating down the superconducting wire to a level below the surface of the liquid cryogen;
   the recovery pulse following the ignition pulse part and comprising a current of a second magnitude less than the first magnitude, for a second duration that causes the superconducting wire below the surface of the liquid cryogen to return to its superconducting state; and
   measuring a resistance of the superconducting wire with the measurement pulse part following the recovery pulse part, said measurement pulse part comprising a current of a third magnitude, greater than the second magnitude but less than the first magnitude, for a third duration, the third duration and the third magnitude being selected for measuring the resistance of the superconducting wire while maintaining a position of the resistive front during the measurement of the resistance.

2. The method according to claim 1, further comprising the step of monitoring a voltage appearing across the superconducting wire as a result of step of passing electric current through the superconducting wire, and detecting a selected voltage to provide an indication that propagation of the resistive front has begun.

3. The method according to claim 2 wherein, if the selected voltage is not reached within a predetermined time, aborting the measurement of the resistance, and indicating a fault.

* * * * *